Patented Dec. 19, 1950

2,534,240

UNITED STATES PATENT OFFICE 2,534,240

8-HALOXANTHINE SALTS OF N,N-DIALKYL-N' - PYRIDYL - N' - THENYLALKYLENEDI-AMINES AND THE PRODUCTION THEREOF

John W. Cusic, Skokie, Ill., assignor to G. D. Searle & Co., Chicago, Ill., a corporation of Illinois No Drawing. Application July 7, 1949, Serial No. 103,530

13 Claims. (Cl. 260—253)

This invention relates to haloxanthine compounds of N,N-dialkyl-N'-pyridyl-N'-thenylalkylenediamines, and to the production thereof. More particularly this invention relates to 8-haloxanthine salts of organic bases having the following general structural formula

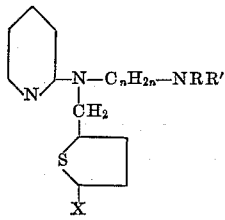

wherein R and R' are lower alkyl radicals, $n$ is a small positive integer, and X is hydrogen or halogen, and wherein the 8-haloxanthine contains a hydrogen atom in position 7. The compounds of the foregoing type are sufficiently strong organic bases to form salts with 8-haloxanthines which have a free hydrogen in the 7-position.

This application is a continuation-in-part of my copending applications Serial No. 71,763, filed January 19, 1949, and Serial No. 90,553, filed April 29, 1949, the latter having been abandoned.

In the foregoing structural formula R and R' represent the same or different lower alkyl radicals such as methyl, ethyl, propyl, and butyl. $n$ is an integer from 2 to 5, preferably 2. The substituent X may be hydrogen or chlorine or bromine.

It is widely recognized that organic bases of the foregoing type elicit certain undesirable side reactions and toxic manifestations. The most common effects are dizziness and sleepiness following the administration of the medication. In certain cases there may be nausea and vomiting. Other effects which have been noticed include weakness, narcolepsy, indigestion, coldness of the extremities, exhaustion, irritability, blurred vision, confusion, and in rare instances collapse. The symptoms produced by N,N-dialkyl-N'-pyridyl-N'-thenylalkylenediamines are often severe enough to warrant reduced dosage or discontinuance of the medication.

It is the object of this invention to produce therapeutic compositions of matter which are relatively free from untoward reactions. A further object is to produce compositions of N,N-dialkyl-N'-pyridyl-N'-thenylalkylenediamines and haloxanthines of reduced toxicity. Another object is to produce compositions having enhanced therapeutic efficacy. Other objects will be apparent to those skilled in the art, in view of the disclosure given herein.

I have discovered that salts of N,N-dialkyl-N'-pyridyl-N'-thenylalkylenediamines with haloxanthines produce little effect on the central nervous system and are therapeutically more useful than any of the individual components alone. The salts of N,N-dialkyl-N'-pyridyl-N'-thenylalkylenediamines and haloxanthines exert a potentiating effect and show enhanced activity in combatting the effects of histamine. As such they are especially useful in the treatment of anaphylaxis and of allergic disorders.

Certain of the compositions within the scope of my invention are so free from undesirable side effects that they may actually be used in suppressing those undesirable symptoms commonly elicited by the usual antihistaminic drugs. For instance, my compounds can be used to prevent or alleviate nausea, motion sickness, dizziness and other distressing reactions.

Among the halogenated xanthines to which this invention pertains are the chloro, bromo, and iodo derivatives of theophylline, and related xanthines which have a hydrogen atom in position 7.

In particular this invention is concerned with acidic xanthines such as 8-chlorotheophylline
8-bromotheophylline
8-chloroxanthine
3-methyl-8-chloroxanthine
8-bromoxanthine
3-methyl-8-bromoxanthine
1,3-diethyl-8-bromoxanthine
1,3-diethyl-8-chloroxanthine
8-iodotheophylline
8-iodo-1,3-diethylxanthine Compositions of N,N-dialkyl-N'-pyridyl-N'-thenylalkylenediamines and haloxanthines are readily prepared by dissolving the base in a suitable solvent and treating the resulting solution with a solution of halogenated xanthine. Solvents which are satisfactory for this reaction include the lower alcohols and ketones and their mixtures with water, ethers and hydrocarbons. Generally small excesses of the base are desirable in these synthetic procedures. The desired salt generally crystallizes out of the solution on chilling or standing, or may be precipitated by addition of a solvent such as ether or benzene. A simple and efficient alternative method is that of heating together at 50–100° C. equivalent amounts of the liquid base and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the base. During the heating, ammonia is evolved and the haloxanthine salt of the N,N-dialkyl-N'-pyridyl-N'-thenylalkylenediamine is formed. On chilling the salt often precipitates; in other cases it may be isolated by precipitation with a solvent such as ether or benzene, or by evaporation. The salt can be further purified, if necessary, by washing or trituration with a suitable solvent, or by recrystallization.

The following examples illustrate in more detail my invention, but in no way are to be construed as limiting it in spirit or in scope.

*Example 1*

130 parts of N-β-dimethylaminoethyl-N-α-thenyl-α-aminopyridine (B. P. 168–170° C. at 1 mm. pressure) (also named N,N-dimethyl-N'-(α - pyridyl) - N' - (α - thenyl) ethylenediamine) which has the formula

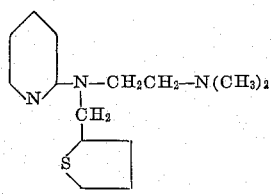

and 80 parts of 8-chlorotheophylline are dissolved in 400 parts of hot methyl ethyl ketone and 20 parts of hot water. The solution is chilled and then evaporated to a glassy residue of the N-β-dimethylaminoethyl-N-α-thenyl - α - aminopyridine salt of 8-chlorotheophylline. This is dissolved in the minimum of hot ethyl acetate, chilled and diluted with ether. The precipitated salt is separated by decantation and dried at about 60° C. A sample of this salt on analysis showed 7.32% and 7.36% chlorine (the calculated amount is 7.45%).

*Example 2*

30 parts of N-β-dimethylaminoethyl-N-δ-chloro-α-thenyl-α-aminopyridine (also named N,N-dimethyl-N'-(2-pyridyl)-N'-(5 - chloro - 2 - thenyl)ethylenediamine) which has the formula

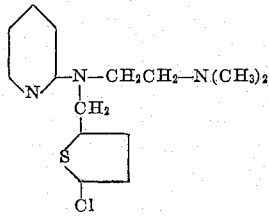

and 20.5 parts of 8-bromotheophylline are dissolved in a hot mixture of 85 parts of methyl ethyl ketone and 5 parts of water. The hot solution is filtered and evaporated. The residue of the N-β-dimethylaminoethyl-N-δ-chloro-α-thenyl-α-aminopyridine salt of 8-bromotheophylline is dissolved in a small amount of hot ethyl acetate, chilled, diluted and the precipitate of the salt is separated and dried at about 60° C.

*Example 3*

30 parts of 8-iodotheophylline and 27 parts of N,N - dimethyl - N' - (α-pyridyl) -N'-(α-thenyl)-ethylenediamine are dissolved in a hot mixture of 250 parts of methyl ethyl ketone and 60 parts of water. The hot solution is filtered and evaporated with steam. The residue of the 8-iodotheophylline salt of N,N-dimethyl-N'-(α-pyridyl)-N'-(α-thenyl)ethylenediamine is triturated with ether, collected on a filter and dried. This salt contains about 54% 8-iodotheophylline.

*Example 4*

80 parts of N,N-dimethyl-N'-(2-pyridyl)-N'-(5 - chloro - 2 - thenyl)-ethylenediamine and 60 parts of 8-chlorotheophylline are dissolved in a hot mixture of 400 parts of methyl ethyl ketone and 100 parts of water. The hot solution is decanted from a small residue of undissolved 8-chlorotheophylline, and evaporated slowly in an oven at 60–65° C. The solid residue of the 8-chlorotheophylline salt of N,N-dimethyl-N'-(2-pyridyl) - N' - (5 - chloro-2-thenyl) -ethylenediamine is triturated with ether, collected on a filter and dried. A sample on analysis showed 13.90% chlorine; the calculated value is 13.89%.

*Example 5*

A mixture of 26 parts of 8-bromotheophylline and 35 parts of N,N-dimethyl-N'-(2-pyridyl)-N' - (5-bromo - 2 - thenyl) ethylenediamine (also named N-β-dimethylaminoethyl-N-δ-bromo- α -thenyl-α-aminopyridine), which has the formula

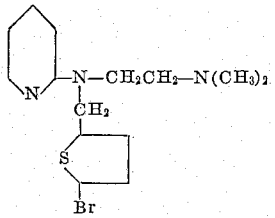

is dissolved in a hot mixture of 250 parts of methyl ethyl ketone and 50 parts of water. The hot solution is filtered and evaporated. The residue of the 8-bromotheophylline salt of N,N-dimethyl-N'-(2-pyridyl)-N'-(5-bromo-2 - thenyl)-ethylenediamine is triturated with cold ethyl acetate, collected on a filter, and dried. A sample on analysis showed 26.81% bromine; the calculated value is 26.67%.

I claim:

1. An 8-haloxanthine salt of a compound of the formula

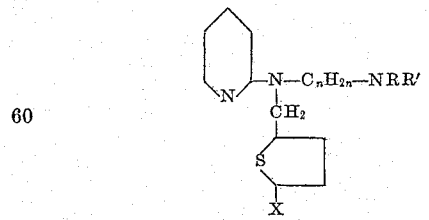

wherein R and R' are lower alkyl radicals, $n$ is an integer from 2 to 5 and X is a member of the group consisting of hydrogen and halogen atoms, and wherein the 8-haloxanthine has a hydrogen atom in position 7.

2. An 8-haloxanthine salt as in claim 1 wherein R and R' are methyl radicals.

3. An 8-haloxanthine salt as in claim 2 wherein $n$ is 2.

4. An 8-haloxanthine salt as in claim 3 wherein X is hydrogen.

5. An 8-haloxanthine salt as in claim 3 wherein X is halogen.

6. An 8-haloxanthine salt as in claim 3 wherein X is chlorine.

7. An 8-halotheophylline salt of N-β-dimethylaminoethyl-N-α-thenyl-α-aminopyridine.

8. The 8-chlorotheophylline salt of N-β-dimethylaminoethyl-N-α-thenyl-α-aminopyridine.

9. An 8-halotheophylline salt of N-β-dimethylaminoethyl-N-δ-chloro-α-thenyl-α-aminopyridine.

10. The 8-chlorotheophylline salt of N-β-dimethylaminoethyl-N-δ-chloro-α-thenyl-α-aminopyridine.

11. The process of preparing an 8-haloxanthine salt of an N,N-dialkyl-N'-pyridyl-N'-thenylalkylenediamine which comprises reacting an 8-haloxanthine which contains a hydrogen atom in position 7 with an N,N-dialkyl-N'-pyridyl-N'-thenylalkylenediamine in an inert, water-soluble organic solvent and separating the salt thus formed.

12. The process of preparing an 8-halotheophylline salt of an N,N-dimethyl-N'-α-pyridyl-N'-α-thenylethylenediamine which comprises reacting an 8-halotheophylline with an N,N-dimethyl-N'-α-pyridyl-N'-α-thenylethylenediamine in an inert, water-soluble organic solvent and separating the salt thus formed.

13. The process of preparing the 8-chlorotheophylline salt of N-β-dimethylaminoethyl-N-α-thenyl-α-aminopyridine which comprises reacting an equivalent of 8-chlorotheophylline with an equivalent of N-β-dimethylaminoethyl-N-α-thenyl-α-aminopyridine in methyl ethyl ketone and water, separating the salt thus formed, dissolving said salt in ethyl acetate, precipitating the same with ether, and separating the salt so obtained.

JOHN W. CUSIC.

REFERENCES CITED

The following references are of record in the file of this patent:

Chem. and Eng. News, 26, p. 30 (1948).